United States Patent [19]

Divine

[11] 4,212,198
[45] Jul. 15, 1980

[54] BOREHOLE PRESSURE SENSING SYSTEM

[75] Inventor: David L. Divine, Midland, Tex.

[73] Assignee: Texaco Inc., White Plains, N.Y.

[21] Appl. No.: 24,630

[22] Filed: Mar. 28, 1979

[51] Int. Cl.² .......................................... E21B 47/06
[52] U.S. Cl. .................................................... 73/151
[58] Field of Search ............... 73/151, 705, 733, 743, 73/753, 152; 250/231 P; 350/96.10

[56] References Cited

U.S. PATENT DOCUMENTS

| 3,237,012 | 2/1966 | Treffeisen | 350/96.1 X |
| 3,968,691 | 7/1976 | Balkanli | 73/152 X |

Primary Examiner—Jerry W. Myracle
Attorney, Agent, or Firm—Carl G. Ries; Robert A. Kulason; Ronald G. Gillespie

[57] ABSTRACT

A borehole pressure sensing system includes a tool having an outer shell having an end which enters a borehole, traversing an earth formation, first. The end has an opening extending from the interior of the tool to the borehole. A pressure sensitive device is inserted in the opening. Bourdon-tube apparatus is arranged with the pressure sensitive device so that as the borehole pressure changes the bourdon-tube apparatus will change its rotational position around the longitudinal axis of the opening. An encoder includes a mask having opaque and translucent areas and is affixed to the bourdon-tube apparatus so that as the bourdon-tube apparatus changes its position, the mask is rotated accordingly. A light grate, spatially related to the mask, divides a received light beam to provide a plurality of light beams in a manner to impinge on the mask. A transmission subsystem of light conductors comprises one conductor which conducts light from the surface to the grate. A plurality of conductors in the transmission subsystem is arranged with the grate and the mask so that the mask is between the grate and the light conductors which conduct any of the plurality of light beams passing through the mask. Surface apparatus includes a source of light arranged with the one conductor of the transmission subsystem so as to provide light to the one conductor.

7 Claims, 3 Drawing Figures

BOREHOLE PRESSURE SENSING SYSTEM

BACKGROUND OF THE INVENTION

Field of the Invention

The present invention is related to pressure system sensing systems in general and, more particularly, to a pressure sensing system for use in a borehole traversing an earth formation.

SUMMARY OF THE INVENTION

A borehole pressure sensing system includes a tool having an outer shell having an end which enters a borehole, traversing an earth formation, first. The end has a passage from the interior of the tool to the exterior of the tool. A pressure sensitive device is inserted in the passage. Bourdon-tube apparatus is arranged with the pressure sensitive device so that as the borehole pressure changes the bourdon-tube will change its rotational position along the longitudinal axis. An encoder includes a mask having opaque and translucent areas is affixed to the bourdon-tube so that as the bourdon-tube changes, the mask is rotated accordingly. A light grate, spatially related to the mask, divides a light beam and provides a plurality of light beams from the received light beam. A transmission subsystem of light conductors in which one conductor conducts light from the surface to the grate. A plurality of conductors in the transmission system is arranged with the grate and the mask so that the mask is between the grate and the light conductors which conduct any of the plurality of light beams passing through the mask. Surface apparatus includes a source of light arranged with the one conductor of the transmission subsystem so as to provide light to the one conductor. Display apparatus is connected to the plurality of light conductors of the transmission subsystem and provides a display corresponding to the pressure in the borehole in accordance with the light conducted by the plurality of light conductors.

The objects and advantages of the invention will appear more fully hereinafter from a consideration of the detailed description which follows, taken together with the accompanying drawings, wherein one embodiment of the invention is illustrated by way of example. It is to be expressly understood, however, that the drawings are for illustration purposes only, and are not to be construed as defining the limits of the invention.

DESCRIPTION OF THE INVENTION

Figure 1:
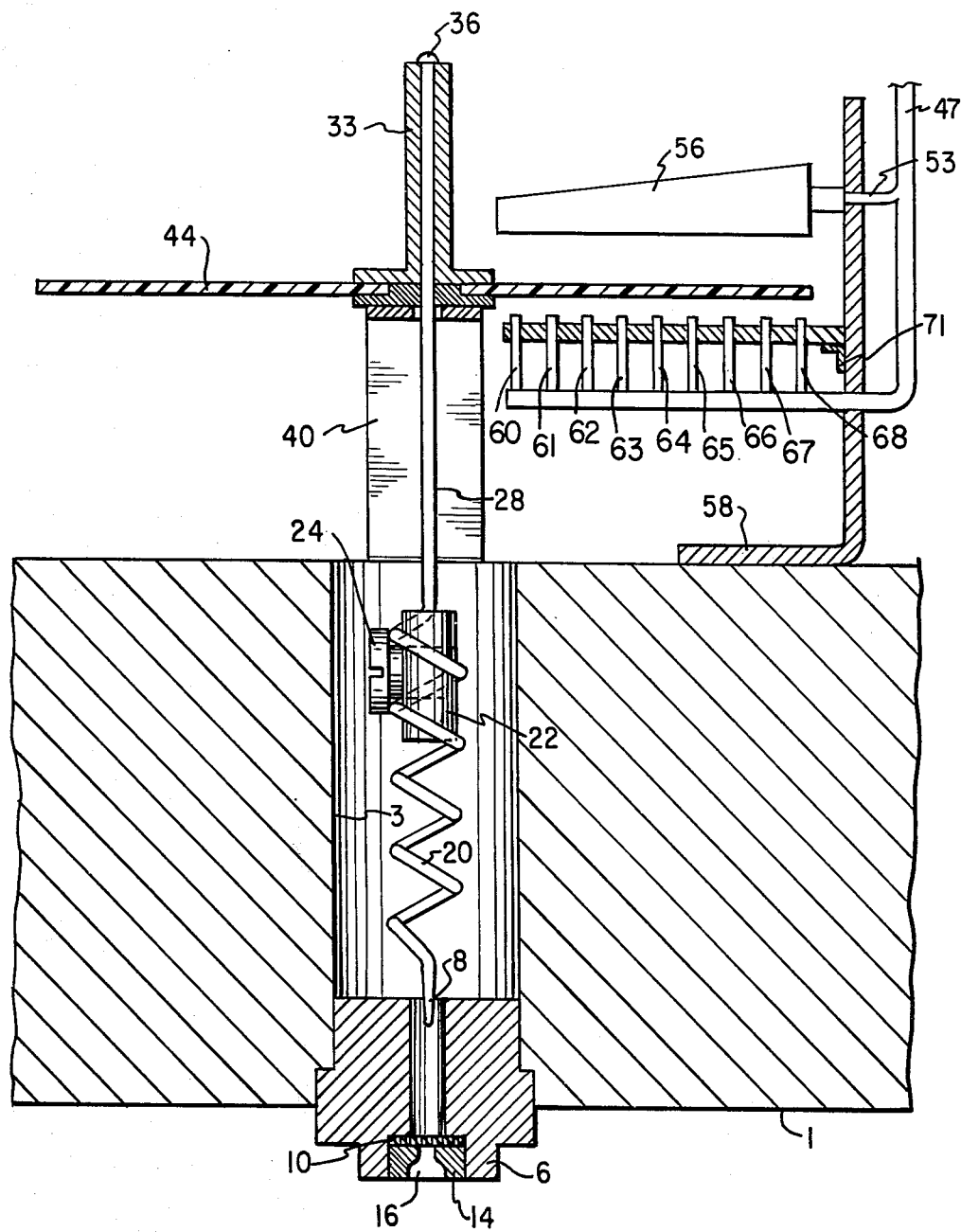
FIG. 1 shows that portion of a logging tool of a pressure sensing system constructed in accordance with the present invention.

Referring to FIG. 1, a conventional well logging sonde (not shown in its entirety) has a bottom end 1 having a passage 3. The present invention is not restricted to well logging operations, for example it may also be used during well pumping operations. An insert 6 has an opening 8 which is sealed by a diaphram 10. Diaphram 10 is held in place by a plug 14 having an opening 16 so that diaphram 10 is subjected to whatever pressures exist externally at the bottom end 1 of the logging sonde.

A bourdon-tube 20 is coiled around a member 22 and has one end extended into opening 8. Bourdon-tube 20 is held in place by a screw 24. Affixed to member 22 is a shaft 28 which is connected to a collar bearing 33 by a seal 36. Collar bearing 33 is held in a predetermined manner by a support 40 affixed to the bottom end 1 in a manner so that shaft 28 lies along the longitudinal axis of the well logging sonde. Further, collar bearing 33 is free to rotate around the longitudinal axis.

Figure 2:
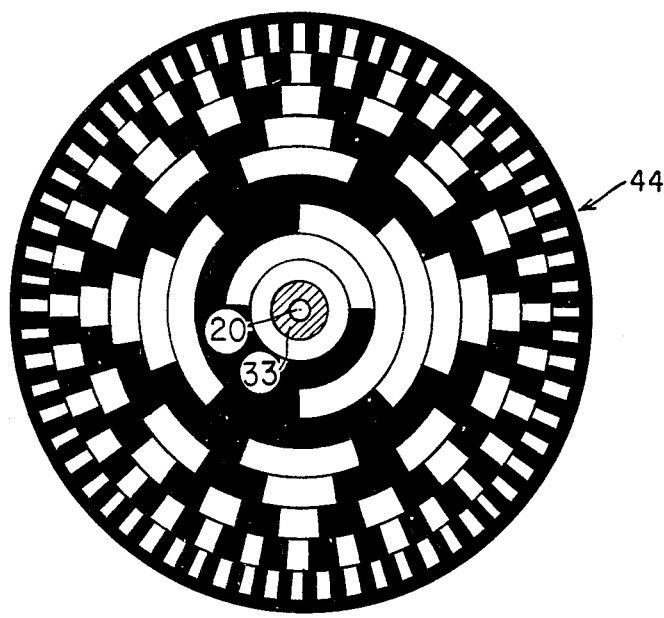
FIG. 2 is a graphical representation of the encoding of the mask shown in FIG. 1.

A mask 44 is attached to collar bearing 33 so that as collar bearing 33 rotates, mask 44 rotates accordingly. Mask 44 is shown in greater detail in FIG. 2. As can be seen, mask 44 is divided into nine tracks, each track being partially transparent, as shown by the clear portions of FIG. 2, and partially opaque, as shown by the shaded portions of FIG. 2. The clear and opaque portions of mask 44 causes mask 44 to be an optical encoder.

Figure 3:
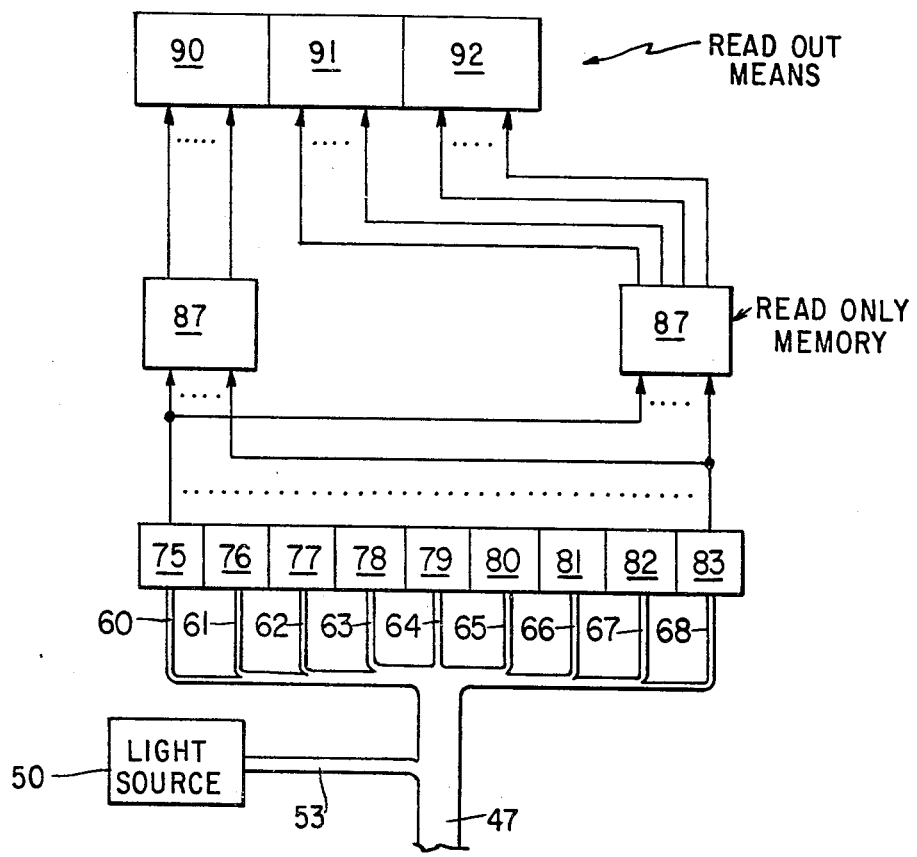
FIG. 3 is a schematic representation of the surface electronics and the cable constructed in accordance with the present invention.

A cable 47 of fiber optic conductors carries light up and down hole as hereinafter explained. Referring to both FIGS. 1 and 3, a light source 50 provides light to a fiber optic conductor 53 where it is conducted downhole to a light grate 56. Light grate 56 is attached to a support member 58 which in turn is affixed to bottom end 1. Light grate 56 refracts the light from conductor 53 so that it falls across a predetermined portion of mask 44 traversing the tracks. Positioned immediately below that portion of mask 44 is a plurality of fiber optic conductors 60 through 68, or one conductor for each track of mask 44.

Conductors 60 through 68 are maintained in place by a holder 70 which is affixed to support member 58 by a bracket 71.

In operation, the pressure external to the logging sonde causes diaphram 10 to extend accordingly thereby causing a corresponding change in pressure in opening 8. The change in pressure affects bourdon-tube 20 causing it to rotate member 22 and hence mask 44, accordingly. The final positioning of mask 44 encodes the refracted light from light grate 56 to identify the pressure. The Gray code is used in the present example; however, any type of coding may be used.

Conductors 60 through 68 are optically connected to light sensitive diodes 75 through 83, respectively, each diode provides an electrical signal at a high logic level when impinged by light. The signals are provided to conventional type read-only memories 87 and 88. Memories 87, 88 have had correlations previously stored into them relating the signals from diodes 75 through 83 to pressures. Memory 87 provides binary-coded-digital (BCD) signals corresponding to a first digit to a light emitting digital read-out element. Memory 87 provides a different set of BCD signals to read-out elements 90 and 91 which provide a read-out of two more digits.

By way of example, assuming that the pressure range is from 0 to 3584 psi; the readings would change in 7 psi increments, since the 9 bit code allows 512 combinations.

What is claimed is:

1. A bottom hole pressure sensing system comprising a tool adapted to pass through a borehole traversing an earth formation, said tool includes an outer shell having an end which enters the borehole first, said end having an opening, pressure sensitive means located in said opening, bourdon-tube means arranged with the pressure sensitive means so that as the borehole pressure changes the bourdon-tube will change its rotational position along a longitudinal axis, encoding means, including a mask having opaque and translucent areas is affixed to the bourdon-tube so that as the bourdon tube changes the mask is rotated accordingly; splitting means spacially related to the mask for receiving a light beam and splitting it to provide a plurality of light beams impinging upon the mask; a transmission subsystem of light conductors having one conductor conducting light from the surface to the splitting means and a plurality of conductors spacially arranged with the splitting means and the mask so that the mask is between said splitting means and said plurality of light conductors which conduct any of the plurality of light beams passing through said mask; surface apparatus including a source of light arranged with the one conductor of the transmission system so as to provide light to the one conductor, and means connected to the plurality of light conductors in the transmission subsystem for providing a display corresponding to the pressure in the borehole in accordance with the light conducted by the plurality of light conductors.

2. A system as described in claim 1 in which the opaque and translucent areas of the mask are arranged in concentric tracks on the mask and in a manner so as to encode the light beams from the splitting means in accordance with the position of the mask.

3. A system as described in claim 1 in which the pressure senstive means includes an insert fitted into the hole in the end of the tool shell having a clearance shaft of one diameter extending from the insert interior surface in the hole a predetermined distance and having a second clearance shaft has a larger diameter than the first shaft and having the same longitudinal axis and at a predetermined distance so that there is a clear passage from the inside of the hole to the borehole, a diaphram inserted into the second shaft so as to separate said first shaft from said second shaft, a plug with a vent hole inserted into said second shaft to hold the diaphram in place and so that pressure in the borehole will affect the diaphram thereby causing a pressure effect within said first shaft and the one end of the bourdon-type is inserted into the first shaft.

4. A system as described in claim 3 in which the encoding means also includes a support connected to the shell and having a passage arranged to the opening in the shell, a rod connected to bourdon-tube means and a bushing affixes the rod to the mask and supported by the support in a manner so that the mask is free to rotate.

5. A system as described in claim 4 in which the bourdon-tupe means includes a bourdon tube having one end inserted into the first shaft, a plug having an outer diameter substantially equal to the inner diameter of the coil on the bourdon tube and affixed to the rod so that as the bourdon tube turns in accordance with the pressure, there is a corresponding rotation by the mask.

6. A system as described in claim 5 in which the display means includes a plurality of light to electrical converters arranged with the plurality of light conductors in the transmission system for converting light conducted by those conductors to electrical signals, memory means connected to the converters for storing the signals from the converters and providing binary coded decimal signals corresponding to the stored signals, and read out means connected to the memory means for providing a display in accordance with the binary coded decimal signals from the memory means.

7. A system as described in claim 6 in which opaque and translucent areas of the mask are arranged so that light passing through the mask is encoded with a Gray code.

* * * * *